United States Patent [19]

Kim et al.

[11] Patent Number: 5,283,287
[45] Date of Patent: Feb. 1, 1994

[54] PROCESS FOR PREPARING THERMOPLASTIC RESIN COMPOSITION WITH EXCELLENT HCFC RESISTANCE

[75] Inventors: Young M. Kim; Chan H. Lee; Jeong S. Yu, all of Daejeon, Rep. of Korea

[73] Assignee: Lucky Limited, Seoul, Rep. of Korea

[21] Appl. No.: 991,284

[22] Filed: Dec. 16, 1992

[30] Foreign Application Priority Data

Jun. 3, 1992 [KR] Rep. of Korea ............... 92-9631

[51] Int. Cl.$^5$ ............... C08L 55/02; C08L 25/12; C08F 279/04
[52] U.S. Cl. ............................ 525/86; 525/78; 525/80; 525/84; 525/259; 525/261; 525/316; 524/723
[58] Field of Search ............... 525/86, 259, 261, 78, 525/80, 84, 86; 524/723

[56] References Cited

U.S. PATENT DOCUMENTS

| | | | |
|---|---|---|---|
| 3,426,102 | 2/1969 | Solak | 260/879 |
| 3,929,710 | 12/1975 | Nield | 525/86 |
| 3,985,827 | 10/1976 | Hicks | 525/86 |
| 4,120,851 | 10/1978 | Chi | 525/86 |
| 4,243,765 | 1/1981 | Keskkula | 525/86 |

*Primary Examiner*—David Buttner
*Attorney, Agent, or Firm*—Thomas J. Dodd

[57] ABSTRACT

The present invention provides a process for preparing thermoplastic resin compositions having excellent HCFC resistance which comprises:

a first step wherein 50 to 90 parts by weight of a monomer mixture of 50 to 80% by weight of a vinyl cyanide, 20 to 50% by weight of an aromatic vinyl compound and 5% by weight or less of an unsaturated carboxylic acid or esters thereof or a vinyl acetate are graft-polymerized in the presence of 10 to 50 parts by weight of a rubber latex and also in the presence of 0.001 to 2.0 parts by weight of a polymerization inhibitor to prepare a graft polymer(A);

a second step wherein 100 parts by weight of a monomer mixture of 50 to 80% by weight of a vinyl cyanide, 20 to 50% by weight of an aromatic vinyl compound and 5% by weight or less of an unsaturated carboxylic acid or esters thereof are polymerized, while adding 2.0 parts by weight or less of a polymerization inhibitor to the mixture, to prepare a SAN copolymer(B); and a third step wherein the graft polymer(A) is mixed with the SAN copolymer(B) to form the composition wherein the rubber content in the composition falls within the range of 10 to 30% by weight of the composition.

Also the thermoplastic resin composition can be provided by mixing the graft polymer(A) with a SAN copolymer(C) consisting of 25 to 40% by weight of a vinyl cyanide and 60 to 75% by weight of an aromatic vinyl compound to form the composition wherein the rubber content in the composition falls within the range of 10 to 30% by weight.

7 Claims, No Drawings

PROCESS FOR PREPARING THERMOPLASTIC RESIN COMPOSITION WITH EXCELLENT HCFC RESISTANCE

FIELD OF THE INVENTION

The present invention relates to a process for preparing thermoplastic resin compositions having excellent HCFC (hydrochlorofluorocarbon)resistance and thermoformability without any discoloration; and, more specifically, to a process which comprises mixing a graft polymer prepared by utilizing a polymerization inhibitor during the graft polymerization with a SAN (styrene-acrylonitrile) copolymer to obtain said thermoplastic resin composition.

BACKGROUND OF THE INVENTION

In general, polyurethane foams have been employed as an insulator between an inner box and an outer case of a refrigerator; and CFC(chlorofluorocarbon) has been employed as a foaming agent in manufacturing the polyurethane forms. However, the use of CFC has become restricted since CFC was found to destroy the ozone layer in the stratosphere.

Accordingly, CFC is being replaced with HCFC which is known to be less destructive of the ozone layer. However, when HCFC is employed as the foaming agent, it tends to cause severe environmental stress in the ABS(acrylonitrile-butadiene-styrene) resin which is used in building the inner box of a refrigerator, rendering the ABS resin unsuitable for use in the manufacture of a refrigerator cabinet. Accordingly, an alternative resin having suitable HCFC resistance has been sought to replace the ABS resin.

In this connection, it has been known that the more nitrile is added to a resin, the higher resistance to chemicals in general is obtained(see U.S. Pat. No. 3,426,102). However, if the content of nitrile in a resin is too high, the impact strength and the fluidity of the resin are deteriorated and, furthermore, the color thereof tends to change to yellow.

Consequently, needs have continued to exist for the development of a resin which is resistant to HCFC without the above and other deficiencies.

SUMMARY OF THE INVENTION

Accordingly, it is an object of the present invention to provide a process for preparing a resin which is devoid of the discoloration problem and which has the excellent HCFC resistance, thermoformability, high impact strength and fluidity by way of: mixing a graft polymer prepared by graft-polymerizing a vinyl cyanide, an aromatic vinyl compound and an unsaturated carboxylic acid in the presence of a rubber latex and also in the presence of a polymerization inhibitor with a SAN copolymer so that the rubber content falls within the range of 10 to 30% by weight of the composition.

DETAILED DESCRIPTION OF THE INVENTION

In accordance with one aspect of the invention, there is provided a process for preparing a thermoplastic resin composition having excellent HCFC resistance with a low YI(yellowness index) which comprises:

a first step wherein 50 to 90 parts by weight of a monomer mixture of 50 to 80% by weight of a vinyl cyanide, 20 to 50% by weight of an aromatic vinyl compound and 5% by weight or less of an unsaturated carboxylic acid or esters thereof or a vinyl acetate are graft-polymerized in the presence of 10 to 50 parts by weight of a rubber latex which comprises up to 20% by weight of small rubber particles and 80 to 100% by weight of large rubber particles and also in the presence of 0.001 to 2.0 parts by weight of a polymerization inhibitor to prepare a graft polymer(A);

a second step wherein 100 parts by weight of a monomer mixture of 50 to 80% by weight of a vinyl cyanide, 20 to 50% by weight of an aromatic vinyl compound and 5% by weight or less of an unsaturated carboxylic acid or esters thereof is polymerized, while adding 2.0 parts by weight or less of a polymerization inhibitor to the mixture, to prepare a SAN copolymer(B); and a third step wherein the graft polymer(A) is mixed with the copolymer(B) to form the composition wherein the rubber content in the composition falls within the range of 10 to 30% by weight of the composition.

Another aspect of the present invention resides in a process for preparing a thermoplastic resin composition which comprises: mixing the graft polymer(A) with another SAN copolymer(C) consisting of 25 to 40% by weight of a vinyl cyanide and 60 to 75% by weight of an aromatic vinyl compound which is prepared by the mass-polymerization thereof so that the rubber content falls within the range of 10 to 30% by weight of the composition.

In carrying out the novel process of the present invention, it is important to prepare the graft polymer(A) in the presence of a rubber latex consisting of 20% by weight or less of small rubber particles and 80 to 100% by weight of large rubber particles while introducing a polymerization inhibitor thereto.

The thermoplastic resin composition obtained in accordance with the present invention is resistant to both HCFC 141b and a mixture of HCFC 141b and HCFC 123. However, when the polymer(A) is mixed with the SAN copolymer(C), the resin composition is still resistant to HCFC 141b, but may prove to be less resistant to a mixture of HCFC 141b and HCFC 123 which comprises 40% by weight or more of HCFC 123.

The small rubber particles used in the present invention are of 0.07 to 0.15μ in diameter; and have a gel content of 70 to 90% and a swelling index of 25 to 40.

The term "swelling index" as used herein is defined as the ratio between the weight of the swelled gel and the weight of the dried gel, i.e., $$\text{Swelling Index} = \frac{\text{Weight of the swelled gel}}{\text{Weight of the dried gel}}$$

The term "gel content(%)" as used herein is defined as the percentage ratio between the weight of polybutadiene rubber and the weight of the gel in the polybutadiene rubber, i.e.,:

$$\text{Gel Content(\%)} = \frac{\text{Weight of the gel in the polybutadiene rubber}}{\text{Weight of the polybutadiene rubber}} \times 100$$

Exemplary small rubber particles which may be used in the present invention include: polybutadiene and a copolymer of butadiene and a monomer capable of copolymerizing with the former which comprises 50% by weight or more of butadiene. Exemplary monomers capable of copolymerizing with butadiene include: aromatic vinyl compounds such as styrene, α-methyl styrene and vinyltoluene; and vinyl cyanides such as acrylonitrile and methacrylonitrile.

The large rubber particles useful in the present invention are those prepared by agglomerating the small rubber particles with an acid such as sulfuric acid, acetic acid, methacrylic acid and acrylic acid. The diameter of the agglomerated rubber particles is in the range of 0.25 to 0.35μ.

Representative aromatic vinyl compounds useful in the graft polymerization include styrene, α-methylstyrene and vinyltoluene, and useful vinyl cyanides may include acrylonitrile and methacrylonitrile. In addition, unsaturated carboxylic acids such as acrylic acid and methacrylic acid or esters thereof such as methyl, ethyl, propyl, n-butyl and i-butyl ester and vinyl acetate may be employed in the graft polymerization.

The graft polymerization is conducted by using a conventional emulsifier, a chain transfer agent, a polymerization initiator and the like. Representative examples of said emulsifier may include: rosinates such as potassium rosinate and sodium rosinate; fatty acid salts such as potassium oleate and sodium stearate; alkylaryl sulfonates and the like. Exemplary chain transfer agents which may be employed are: mercaptans such as t-dodecyl mercaptan and n-dodecylmercaptan, terpenes such as terpinolene, dipentene, t-terpene, halogenated hydrocarbons such as chloroform and tetrachlorocarbon and the like.

Representative examples of the polymerization initiator include: organic peroxides such as cumene hydroperoxide and diisopropylbenzene hydroperoxide; pivalates such as t-butyl peroxypivalate; and a redox system of said peroxides and reductants.

Conventionally, the polymerization inhibitor is introduced after the completion of the polymerization to prevent further polymerization. However, the polymerization inhibitor in the present invention is introduced during the polymerization to control the sequence of the polyacrylonitrile units which produce polyimines and nitrone-imine copolymers which tend to cause the discoloration problem; and representative examples thereof may include: p-t-butyl catechol, α-nitroso-β-naphthol, di-t-amylhydroquinone, dinitrobenzenethiol, dinitrophenylbenzothiazyl sulfide, sodium hydrosulfide, tetramethylthiuram disulfide, tetramethylthiuramide sulfide, dinitrophenylpyridinium chloride, metal salts of dialkyldithiocarbamate such as sodium dimethyldithiocarbamate and potassium dimethyldithiocarbamate, nitric oxide, phenylhydrazine, hydroxynaphthylamine, p-nitrosomethylaniline, bis-(p-hydroxynaphthyl)amine, tetraethylenepentaamine, bis-(p-hydroxyphenyl)amine and the like.

In the graft polymerization, all the components may be introduced all at once in the total amount thereof or divisionally in several steps or in a continuous mode.

In the present invention, the components are preferably introduced divisionally in two or three steps wherein all of the components in their proportionate amounts are introduced all at once in the first step; an emulsion containing an emulsifier, monomers, a chain transfer agent and water together with a polymerization initiator and a polymerization inhibitor are continuously introduced in the second step until the conversion reaches a level of about 94%; and the monomers, a polymerization initiator and a polymerization inhibitor are continuously introduced in the third step to complete the polymerization.

The term "conversion" as used herein is defined as the percentage ratio between the total amount of the monomers introduced and the polymer formed therefrom, i.e.,:

$$\text{Conversion}(\%) = \frac{\text{Amount of polymer produced}}{\text{Total amount of monomers introduced}} \times 100$$

The SAN copolymer(B) may be prepared by employing a conventional method, except that 0.02 part by weight or less of a polymerization inhibitor is introduced during the polymerization; and the SAN copolymer(C) may be prepared by employing a conventional mass-polymerization method.

The following examples are given to further illustrate the invention and should not be construded as limiting its scope. In the following examples, all parts and percentages are given in terms of weight unless otherwise specified.

The physical properties provided in the examples are determined in accordance with the following test conditions and methods:

A. Tensile Strength and Tensile Elongation: ASTM D 638

B. Flexural Strength and Flexural Modulus: ASTM D 790.

C. Izod Impact Strength: ASTM D 256

D. Melt Flow Index(MI): ASTM D 1238(220° C., 10 kg)

E. Stress Crack Resistance to HCFC 141b and a mixture of HCFC 123 and HCFC 141b: the surface was visually observed and the critical strain was determined after a pressed test piece (35 mm×150 mm×2 mm) was fixed to a constant strain fixture of various curvatures (maximum strain value: 1.0%) and left in an environment of HCFC at a temperature of 23° C. for 24 hours.

◯: No change of the surface was observed and the critical strain was greater than 0.3%.

Δ: The critical strain was 0.15 to 0.3%.

×: The condition of the surface was poor and the critical strain was less than 0.15%.

F. Yellowness Index(YI): ASTM D 1925

If YI value is less than 45, color conversion to white is generally possible.

G. Hot Tensile Elongation

It was determined as a measure to evaluate the thermoformability by using a test piece of dumbell type(51 mm×15.2 mm×1.8 mm) (both the diameter and the distance of the notch are 6.35 mm) at a temperature of 140° C. If the value was greater than 800%, it was evaluated to have good thermoformability.

H. Chemical Resistance to HCFC: ASTM D 543

The weight change of a test piece was determined after the test piece was immersed in HCFC at a temperature of 23° C. for 1 day.

EXAMPLE 1

Step A. Preparation of small and large rubber particles 100 parts of 1,3-butadiene, 3.3 parts of potassium oleate as an emulsifier, 0.3 part of potassium persulfate as an initiator, 0.2 part of t-dodecylmercaptan as a chain transfer agent and 150 parts of water were introduced to a polymerization reactor followed by raising the inner temperature of the reactor to 55° C.

When the conversion reached 30%, 0.1 part of t-dodecylmercaptan was introduced to the reactor followed by raising the reaction temperature to 60° C.; and, thereafter, when the conversion reached 85%, 0.02 part of N,N-diethylhydroxyamine was introduced to the reactor to stop the reaction; and the unreacted monomers were recovered to obtain the small rubber particles(i) having 0.09μ of an average diameter, 83% of a gel content and 35 of a swelling index.

The small rubber particles(i) thus obtained were agglomerated with acetic acid to prepare the large rubber particles (ii) having 0.25 to 0.35μ of an average diameter.

Step B. Preparation of a graft polymer

First stage:

| Components | Amount (parts) |
| --- | --- |
| rubber particles (i) | 2 |
| rubber particles (ii) | 28 |
| potassium rosinate | 1.0 |
| water | 130 |
| styrene | 8.4 |
| acrylonitrile | 12.6 |
| t-dodecylmercaptan | 0.4 |
| sodium formaldehydesulfoxylate | 0.04 |
| ethylenediaminetetraacetic acid.4 sodium salt | 0.01 |
| ferrous sulfate heptahydrate | 0.001 |
| tetramethylthiuram disulfide | 0.01 |
| diisobutylbenzenehydroperoxide | 0.04 |

All the above components were introduced to a reactor all at once and polymerized for 1 hour at a temperature of 60° C.

Second stage:

| Components | Amount (parts) |
| --- | --- |
| styrene | 14.8 |
| acrylonitrile | 29.4 |
| t-dodecylmercaptan | 0.9 |
| potassium rosinate | 1.5 |
| water | 80 |
| sodium formaldehydesulfoxylate | 0.08 |
| ethylenediaminetetraacetic acid.4 sodium salt | 0.03 |
| ferrous sulfate heptahydrate | 0.02 |
| tetramethylthiuram disulfide | 0.07 |
| diisobutylbenzenehydroperoxide | 0.1 |

The monomers, the chain transfer agent, the emulsifier and water were mixed to prepare an emulsion; and the emulsion was introduced in a continuous mode over 3 hours together with the aqueous reductant, the initiator and the polymerization inhibitor at a temperature of 65° C.

Third stage:

| Components | Amount (parts) |
| --- | --- |
| methylmethacrylate | 2 |
| sodium formaldehydesulfoxylate | 0.03 |
| ethylenediaminetetraacetic acid.4 sodium salt | 0.01 |
| ferrous sulfate heptahydrate | 0.001 |
| tetramethylthiuram disulfide | 0.005 |
| diisobutylbenzenehydroperoxide | 0.03 |

All of the above components were introduced in a continuous mode over 1 hour at a temperature of 65° C. and polymerized. The polymerization was completed after an aging for 1 hour wherein the conversion was about 99%. A phenolic antioxidant was introduced to the reactor; and the resultant graft polymer latexes were agglomerated with 5% aqueous sulfuric acid, washed and dried to obtain the graft polymer in a powdery form.

Step C. Preparation of SAN copolymer

| Components | Amount (parts) |
| --- | --- |
| acrylonitrile | 60 |
| styrene | 40 |
| t-dodecylmercaptan | 2.0 |
| potassium rosinate | 2.5 |
| water | 220 |
| sodium formaldehydesulfoxylate | 0.1 |
| ethylenediaminetetraacetic acid.4 sodium salt | 0.04 |
| ferrous sulfate | 0.003 |
| tetramethylthiuram disulfide | 0.1 |
| diisobutylbenzenehydroperoxide | 0.1 |

All the components except the monomers, the initiator and the polymerization inhibitor were introduced to the reactor followed by raising the temperature to 65° C.; and then the monomers, the initiator and the polymerization inhibitor were introduced over 5 hours. After the completion of the polymerization, the resultants were agglomerated with 5% aqueous sulfuric acid, washed and dried to obtain the copolymer.

Step D. Preparation of a resin composition 50 parts of the graft polymer, 50 parts of the SAN copolymer, 0.2 part of a phenolic stabilizer and 1.0 part of a lubricant were blended and extruded. The test specimen was prepared by injection molding. The results of the tests are as shown in Table 1.

EXAMPLE 2

The same procedure as in Example 1 was repeated except that the amounts of the graft polymer and the SAN copolymer were changed to 70 parts and 30 parts in Step D, respectively. The results are as shown in Table 1.

EXAMPLE 3

The same procedure as in Example 1 was repeated except that the amounts of the graft polymer and the SAN copolymer were changed to 40 parts and 60 parts in step D, respectively. The results are as shown in Table 1.

EXAMPLE 4

The same procedure as in Example 1 was repeated except that the amounts of some of the components in Step B for preparing the graft polymer were changed as follows:

First stage:

| Components | Amount (parts) |
| --- | --- |
| rubber latex (i) | 1.3 |
| rubber latex (ii) | 18.7 |
| potassium rosinate | 1.0 |
| water | 130 |
| styrene | 9.6 |
| acrylonitrile | 14.4 |
| t-dodecylmercaptan | 0.46 |

Second stage:

| Components | Amount (parts) |
| --- | --- |
| styrene | 22.4 |
| acrylonitrile | 33.6 |

-continued

Second stage:

| Components | Amount (parts) |
|---|---|
| t-dodecylmercaptan | 1.1 |

The test specimen was prepared as in Step D of Example 1 except that 50 parts of the graft polymer so obtained and 50 parts of the SAN copolymer were blended. The results are as shown in Table 1.

EXAMPLE 5

The same procedure as in Example 1 was repeated except that 50 parts of the graft polymer prepared in Step B of Example 1 and 50 parts of the SAN copolymer consisting of 32% of acrylonitrile and 68% of styrene which was prepared by mass-polymerization were blended. The results are as shown in Table 1.

EXAMPLE 6

The same procedure as in Example 5 was repeated except that the amounts of the graft polymer and the SAN copolymer were changed to 70 parts and 30 parts, respectively. The results are as shown in Table 1.

EXAMPLE 7

The same procedure as in Example 1 was repeated except that in the second stage of Step B for the graft polymerization, the amount of styrene was changed to 16.8 parts and the polymerization was completed at the second step after an aging for 1 hour (wherein the conversion was 94%). The results are as shown in Table 1.

EXAMPLE 8

The same procedure as in Example 1 was repeated except that the amounts of styrene and acrylonitrile in the first stage of Step B for the graft polymerization were changed to 10.5 parts, respectively; and the amounts of styrene and acrylonitrile in the second stage were changed to 22.5 parts and 24.5 parts, respectively. The results are as shown in Table 1.

EXAMPLE 9

The same procedure as in Example 8 was repeated except that 50 parts of the graft polymer prepared in Example 8 and 50 parts of the SAN copolymer consisting of 32% of acrylonitrile and 68% of styrene which was prepared by mass-polymerization were blended and extruded. The results are as shown in Table 1.

EXAMPLE 10

The same procedure as in Example 1 was repeated except that methyl methacrylate in the third stage of Step B for the graft polymerization was changed to vinyl acetate. The results are as shown in Table 1.

EXAMPLE 11

The same procedure as in Example 1 was repeated except that Step B for the graft polymerization was carried out as follows:

First stage:

| Components | Amount (parts) |
|---|---|
| rubber latex (i) | 1 |
| rubber latex (ii) | 29 |
| potassium rosinate | 1.0 |
| water | 130 |

-continued

First stage:

| Components | Amount (parts) |
|---|---|
| styrene | 8.4 |
| methacrylonitrile | 3.8 |
| acrylonitrile | 8.8 |
| t-dodecylmercaptan | 0.4 |
| potassium dimethyldithiocarbamate | 0.01 |
| t-butyl peroxypivalate | 0.05 |

All the above components were introduced all at once to a reactor and polymerized for 1 hour at a temperature of 60° C.

Second stage:

| Components | Amount (parts) |
|---|---|
| styrene | 14.8 |
| acrylonitrile | 20.6 |
| methacrylonitrile | 8.8 |
| t-dodecylmercaptan | 0.9 |
| potassium rosinate | 1.5 |
| potassium dimethyldithiocarbamate | 0.07 |
| t-butyl peroxypivalate | 0.1 |

The above components were mixed to prepare an emulsion; and the emulsion was continuously introduced over 4 hours to the reactor and polymerized at a temperature of 65° C.

Third stage:

| Components | Amount (parts) |
|---|---|
| methyl methacrylate | 2 |
| potassium dimethyldithiocarbamate | 0.005 |
| t-butyl peroxypivalate | 0.1 |

The above components were continuously introduced to the reactor over 1 hour and polymerized at a temperature of 65° C. The polymerization was completed after an aging for 1 hour. The results are as shown in Table 1.

EXAMPLE 12

The same procedure as in Example 1 was repeated except that 50 parts of the graft polymer prepared in Step B of Example 1 and 50 parts of the SAN copolymer which was prepared by introducing additionally 2 parts of methylmethacrylate in Step C were blended. The results are as shown in Table 1.

EXAMPLE 13

The same procedure as in Example 1 was repeated except that 50 parts of the graft polymer prepared in Step B of Example 1 and 50 parts of the SAN copolymer which was prepared by omitting tetramethylthiuram disulfide in Step C were blended. The results are as shown in Table 1.

COMPARATIVE EXAMPLE 1

The same procedure as in Example 1 was repeated except that each of the graft polymer and the SAN copolymer was prepared by omitting tetramethylthiuram disulfide. The results are as shown in Table 1.

COMPARATIVE EXAMPLE 2

The same procedure as in Example 7 was repeated except that the amounts of styrene and acrylonitrile in the first stage of Step B for the graft polymerization were changed to 12.6 parts and 8.4 parts, respectively; the amounts of styrene and acrylonitrile in the second stage of Step B for the graft copolymerization were also changed to 29.4 parts and 16.8 parts, respectively; and 50 parts of the graft polymer thus obtained and 50 parts of the SAN copolymer consisting of 25% of acrylonitrile and 75% of styrene which was prepared by mass-polymerization were blended. The results are as shown in Table 1.

COMPARATIVE EXAMPLE 3

The same procedure as in Example 1 was repeated except that 30 parts of the graft polymer prepared in Example 4 and 70 parts of the SAN copolymer were blended. The results are as shown in Table 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Izod Impact Strength |  |  |  |  |  |  |  |  |  |  |
| 20° C. | kg · cm/cm | 20 | 24 | 16 | 22 | 26 | 32 | 18 | 23 | 28 |
| −20° C. |  | 9 | 11 | 8 | 10 | 13 | 15 | 8 | 10 | 14 |
| MI | g/10 min | 3.0 | 2.8 | 3.0 | 2.0 | 5.0 | 3.5 | 2.8 | 3.0 | 6.5 |
| Tensile Strength | kg/cm$^2$ | 610 | 580 | 624 | 590 | 550 | 520 | 630 | 600 | 540 |
| Elongation | % | 13 | 16 | 12 | 14 | 18 | 16 | 13 | 14 | 20 |
| Flexural Strength | kg/cm$^2$ | 990 | 950 | 1020 | 960 | 950 | 930 | 1010 | 960 | 930 |
| Flexural Modulus | kg/cm$^2$ | 28,400 | 28,000 | 29,200 | 28,000 | 27,800 | 26,800 | 28,600 | 28,100 | 27,000 |
| Stress Crack Resistance |  |  |  |  |  |  |  |  |  |  |
| HCFC 141b |  | 0 | 0 | 0 | 0 | 0 | 0 | 0 | 0 | 0 |
| HCFC 141b/123 (70/30) |  | 0 | 0 | 0 | 0 | 0 | 0 | 0 | 0 | 0 |
| HCFC 141b/123 (50/50) |  | 0 | 0 | 0 | 0 | Δ | Δ | 0 | 0 | Δ |
| YI |  | 38 | 39 | 38 | 30 | 30 | 32 | 34 | 35 | 26 |
| Hot Tensile Elongation | % | 900 | 850 | 920 | 860 | 950 | 930 | 930 | 920 | 970 |
| Chemical Resistance | % | 0.1 | 0.2 | 0.1 | 0.2 | 0.4 | 0.3 | 0.1 | 0.3 | 0.5 |

|  | Unit | Example 10 | Example 11 | Example 12 | Example 13 | Comparative Example 1 | Comparative Example 2 | Comparative Example 3 |
|---|---|---|---|---|---|---|---|---|
| Izod Impact Strength |  |  |  |  |  |  |  |  |
| 20° C. | kg.· cm/cm | 22 | 20 | 19 | 20 | 20 | 26 | 12 |
| −20° C. |  | 10 | 9 | 9 | 9 | 8 | 15 | 5 |
| MI | g/10 min | 2.8 | 2.7 | 2.7 | 3.0 | 2.8 | 6.0 | 3.0 |
| Tensile Strength | kg/cm$^2$ | 590 | 620 | 620 | 610 | 600 | 530 | 640 |
| Elongation | % | 14 | 12 | 14 | 13 | 13 | 18 | 8 |
| Flexural Strength | kg/cm$^2$ | 988 | 994 | 1010 | 990 | 980 | 920 | 1100 |
| Flexural Modulus | kg/cm$^2$ | 28,000 | 28,600 | 28,600 | 28,400 | 28,400 | 27,000 | 29,800 |
| Stress Crack Resistance |  |  |  |  |  |  |  |  |
| HCFC 141b |  | 0 | 0 | 0 | 0 | 0 | Δ | 0 |
| HCFC 141b/123 (70/30) |  | 0 | 0 | 0 | 0 | 0 | X | 0 |
| HCFC 141b/123 (50/50) |  | 0 | 0 | 0 | 0 | 0 | X | 0 |
| YI |  | 38 | 36 | 36 | 42 | 63 | 24 | 38 |
| Hot Tensile Elongation | % | 910 | 890 | 900 | 900 | 800 | 980 | 930 |
| Chemical Resistance | % | 0.2 | 0.1 | 0.1 | 0.1 | 0.1 | 10 | 0.2 |

While the invention has been described with respect to the above specific embodiments, it should be recognized that various modifications and changes which may be apparent to those skilled in the art to which the invention pertains may be made and also fall within the scope of the invention as defined by the claims that follow.

What is claimed is:

1. A process for preparing a thermoplastic resin composition having excellent HCFC resistance which comprises:

a first step wherein 50 to 90 parts by weight of a monomer mixture of 50 to 80% by weight of a vinyl cyanide, 20 to 50% by weight of an aromatic vinyl compound and 5% by weight or less of an unsaturated carboxylic acid or esters thereof or a vinyl acetate are graft-polymerized in the presence of 10 to 50 parts by weight of a rubber latex and also in the presence of 0.001 to 2.0 parts by weight of a polymerization inhibitor to prepare a graft polymer(A) wherein the rubber latex comprises 20% by weight or less of the rubber particles having an average diameter of 0.07 to 0.15μ and 80 to 100% by weight of the rubber particles having an average diameter of 0.25 to 0.35μ;

a second step wherein 100 parts by weight of a monomer mixture of 50 to 80% by weight of a vinyl cyanide, 20 to 50% by weight of an aromatic vinyl compound and 5% by weight or less of an unsaturated carboxylic acid or esters thereof are polymerized, while adding 2.0 parts by weight or less of a polymerization inhibitor to the mixture, to prepare a SAN copolymer(B); and a third step wherein the graft polymer(A) is mixed with the SAN copolymer(B) to form the composition wherein the rubber content in the composition falls within the range of 10 to 30% by weight of the composition.

2. A process for preparing a thermoplastic resin composition having excellent HCFC resistance, which comprises: graft-polymerizing 50 to 90 parts by weight of a monomer mixture of 50 to 80% by weight of a vinyl cyanide, 20 to 50% by weight of an aromatic vinyl compound and 5% by weight or less of an unsaturated carboxylic acid or esters thereof or a vinyl acetate in the presence of 10 to 50 parts by weight of a rubber latex and 0.001 to 2.0 parts by weight of a polymerization inhibitor to prepare a graft polymer(A) wherein the rubber latex comprises 20% by weight or less of the rubber particles having an average diameter of 0.07 to 0.15μ and 80 to 100% by weight of the rubber particles having an average diameter of 0.25 to 0.35μ; and, mixing the graft polymer(A) with a SAN copolymer(C) consisting of 25 to 40% by weight of a vinyl cyanide and 60 to 75% by weight of an aromatic vinyl compound which is prepared by mass-polymerization thereof, to form the composition, wherein the rubber content in the composition falls within the range of 10 to 30% by weight of the composition.

3. The process of claim 1 wherein the rubber latex has a gel content of 70 to 90% by weight.

4. The process of claim 1 or 2 wherein the polymerization inhibitor is selected from the group consisting of: p-t-butylcatechol, α-nitroso-β-naphthol, di-t-amylhydroquinone, dinitrobenzenthiol, dinitrophenylbenzothiazyl sulfide, sodium hydrosulfide, tetramethylthiuram disulfide, tetramethylthiuramide sulfide, dinitrophenylpyridinium chloride, sodium dimethyldithiocarbamate, potassium dimethyldithiocarbamate, p-nitrosomethylaniline, tetraethylenepentaamine, bis(p-hydroxynaphthyl)amine, nitric oxide, hydroxynaphthylamine, phenylhydrazine and bis-(p-hydroxyphenyl)amine.

5. The process of claim 1 or 2 wherein the vinyl cyanide is acrylonitrile or methacrylonitrile.

6. The process of claim 1 or 2 wherein the aromatic vinyl compound is styrene, α-methylstyrene or vinyltoluene.

7. The process of claim 1 or 2 wherein the unsaturated carboxylic acid or ester thereof is acrylic or methacrylic acid or methyl, ethyl, propyl, n-butyl or i-butyl ester thereof.

* * * * *